E. F. SMITH.
RULE.
APPLICATION FILED APR. 30, 1915.

1,186,853.  Patented June 13, 1916.

WITNESSES
O. M. Kappler
Thos H Fay

INVENTOR
Edward F. Smith
By Fay, Oberlin and Fay
ATTORNEYS

UNITED STATES PATENT OFFICE.

EDWARD F. SMITH, OF HANNIBAL, MISSOURI, ASSIGNOR TO THE LUFKIN RULE COMPANY, OF SAGINAW, MICHIGAN, A CORPORATION OF MICHIGAN.

RULE.

1,186,853.  Specification of Letters Patent. Patented June 13, 1916.

Application filed April 30, 1915. Serial No. 24,938.

*To all whom it may concern:*

Be it known that I, EDWARD F. SMITH, a citizen of the United States, and a resident of Hannibal, county of Marion, and State of Missouri, have invented a new and useful Improvement in Rules, of which the following is a specification, the principle of the invention being herein explained and the best mode in which I have contemplated applying that principle, so as to distinguish it from other inventions.

The present improvements relate in general to measuring instruments and more particularly to a device to be attached to the end of a measuring instrument or rule for the purpose of permitting the same to be temporarily connected to the end of the object being measured in such position that the end of the rule is alined with the end of the object. The usefulness of such a device will be readily apparent since it will be unnecessary for the user to manually line up the end of the rule with the end of the object being measured, and all that he will have to do is to extend the rule past the end of such object, then pull the rule toward him until the device which is the subject matter of the present invention strikes the end of the object when it will automatically aline the end of the rule therewith. Furthermore, this device or attachment is so made that it lies normally entirely within the boundaries of the rule and does not project to any extent which would, of course, result many times in inconvenience to the user and in possible injury to the rule.

To the accomplishment of the foregoing and related objects, said invention, then, consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

Figure 1:
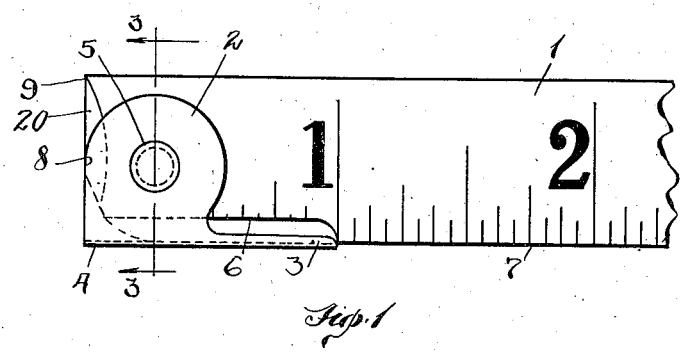
Figure 2:
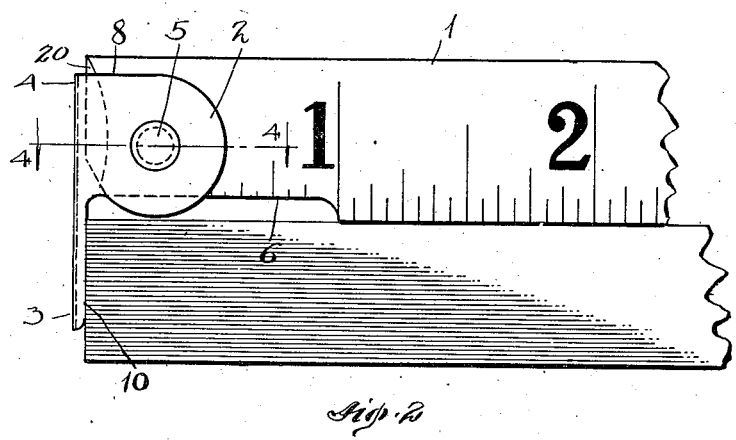
Figure 3:
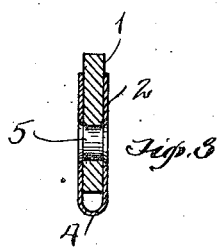
Figure 4:
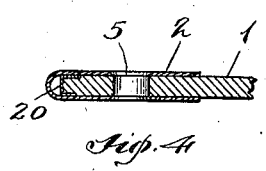

In said annexed drawing:—Figure 1 is a view of a measuring instrument provided with my improvement in its normal position; Fig. 2 is a similar view but showing the hook or attached device in position against the object which is being measured, while Figs. 3 and 4 are sections taken respectively on the lines 3—3 and 4—4 in Figs. 1 and 2 respectively.

In Fig. 1 there is shown a measuring instrument, as for example, a rule, provided with a rigid terminal portion 1. It is immaterial as to whether the measuring instrument is entirely rigid, or is jointed, or is flexible and provided with a rigid terminal portion, so long as there is such a portion to which my measure may be attached. The end is covered by a metal reinforcing strip 20. Pivotally mounted adjacent to the end of such terminal portion is a plate 2 provided with an extending finger 3 and oppositely extending portion forming a stop 4. Such plate will perfectly extend around the end of the portion 1 and may conveniently be attached thereto by means of a suitable stud 5. One edge of the rule adjacent to such end is cut away as at 6, and the finger 3 is so formed as to lie, in the normal position of the plate 2, adjacent to such cut-away edge and to be substantially alined with the measuring edge 7 of the rule, thus forming a substantially continuous surface along the measuring edge as is customary in such rules when not equipped with my improvement. Similarly the plate 2 is so formed at its other side that when it is in this normal position there is an edge 8 which is alined with the end 9 of the rule. When ready for use the plate 2 is swung through 90 degrees into the position illustrated in Fig. 2. In such position the stop 4 on the plate contacts the end 9 of the rule thus alining the inner surface 10 of the finger 3 with the end 9 of the rule. It will be noticed in Figs. 3 and 4 that the sides of the stop portion 4 are curved and contact the edges of the end of the rule 1 when the stop portion is parallel therewith, thus bringing the finger 3 at right angles to the measuring edge of the rule. It will be noted that even in this position the plate 2 lies within the normal boundaries of the rule, that is, no part extends beyond the line of the measuring edge produced, except of course the finger 3.

In Fig. 2 the method of use is shown and it will be seen that the inner side of the finger 10 is in contact with one side or edge of the article which is being measured. It is thus possible for the user to stand at some distance from this side of the object and to hook the end of the rule over the same. Since the end of the rule is in alinement with the edge or side of the object the user can read off the length of the object feeling assured that he is reading the correct length without having to look at the alinement at the end of the rule and the side of the object which is a great convenience and permits much faster measuring than is possible with the usual type of rules.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a measuring instrument, the combination of a rigid terminal portion cut away along one edge adjacent to its end, and a plate pivotally attached to said portion and having a finger adapted, in one pivotal position of said plate, to lie adjacent to the cut away edge in substantial alinement with said edge, said plate having a stop adapted to contact the end of said portion to aline such finger with the end of said portion when said plate is swung through ninety degrees.

2. In a measuring instrument, the combination of a rigid terminal portion, a hook pivotally attached thereto, and a stop on said hook adapted, upon movement of said hook in one direction, to contact the end of the terminal portion and aline the inner surface of said hook with the end of said portion, said hook being formed with an edge alined with the end of said portion when said hook has been swung through ninety degrees from said first mentioned position.

Signed by me this 22 day of April, 1915.

EDWARD F. SMITH.

Attested by—
ROBERT M. CLAYTON,
A. L. HARD.